Patented Feb. 2, 1932

1,843,417

UNITED STATES PATENT OFFICE

HENRY DREYFUS, OF LONDON, ENGLAND

TREATMENT OF MATERIALS MADE OF OR CONTAINING CELLULOSE DERIVATIVES

No Drawing. Application filed July 25, 1927, Serial No. 208,427, and in Great Britain February 9, 1927.

This invention relates to the dyeing, printing and stencilling of threads, yarns, knitted or woven fabrics, or other products made of or containing cellulose acetate or other organic acid esters of cellulose, such for example as cellulose formate, propionate, or butyrate, or the product obtained by the treatment of alkalized cellulose with sulpho-chlorides (e. g. the product known as "immunized cotton" obtained with p-toluene sulphochloride), or made of or containing cellulose ethers, such as methyl, ethyl or benzyl cellulose, or the corresponding condensation products of cellulose and glycols or other polyhydric alcohols, all of which are hereinafter referred to as organic substitution derivatives of cellulose.

According to the present invention materials made of or containing one or more of the said organic substitution derivatives of cellulose are dyed or otherwise coloured with colouring matters or compounds containing one, two or more hydroxy groups attached to a carbon atom or atoms linked directly or through another or other carbon atoms (i. e. containing one, two or more alcoholic groups linked through carbon only) to an aryl dye nucleus or component thereof. Such side chains may contain in addition to the hydroxy group or groups any other desired substituents. Alternatively such colouring matters or compounds may be produced on the fibre or material by combination of components one or more of which contain a hydroxy group or groups so linked.

Such colouring matters or compounds may be produced by any convenient method. Thus for example they may be prepared by reduction of the corresponding ketonic, aldehydic, or carboxylic compounds or of compounds containing two or more of such types of groups for example ketone and carboxylic groups. Further they may be prepared by treatment of the corresponding halogen substituted compounds with alcoholic or aqueous alkalis. Again in some cases hydroxy methyl groups may be introduced by interaction with formaldehyde.

The following examples of colouring matters or compounds for use according to the present invention and of the methods of preparing them are intended to illustrate the invention and not to be in any way limitative.

A. Anthraquinone dyestuffs

Example 1.—α-amino.1.2.4-trimethyl anthraquinone is heated under pressure with excess of bromine at about 170° C. The product after extraction with denatured alcohol and consisting chiefly of the tri- (bromomethyl) derivative is then heated with alcoholic potash to obtain the dyestuff α-amino.-1.2.4-tri-(hydroxymethyl) anthraquinone.

Example 2.—1-hydroxy-4-bromanthraquinone-2-aldehyde is treated with methylamine and the methyl amino derivative heated for 2 hours with acetic anhydride and anhydrous sodium acetate. The product, which is 1-hydroxyl-4-methylamino-anthraquinonyl-2-acrylic acid, is brominated and treated with an aqueous solution of potassium carbonate. The dyestuff produced is the potassium salt of the corresponding α-β-dihydroxy-propionic acid derivative

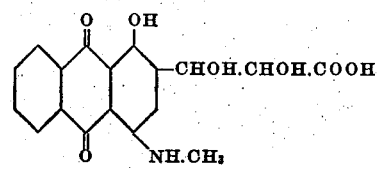

Similarly dyestuffs of the condensed anthraquinone series, such as benzanthrone and indanthrone, may be obtained by introduction of alcoholic groups connected by carbon to the dye nucleus.

B. Azo dyestuffs

Example 3.—o-amino - β - phenylglyceric acid (HN$_2$.C$_6$H$_4$.CHOH.CHOH.COOH) is diazotized and coupled with o-hydroxy-β-phenyl lactic acid to obtain the dyestuff

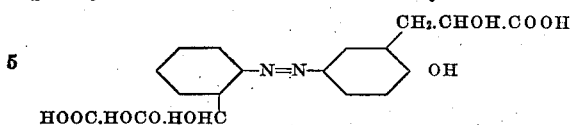

*Example 4.*—p-amino-β-phenyl lactic acid is diazotized and coupled with α-naphthylamine. The product

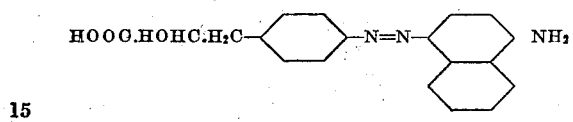

may be diazotized on the fibre or material and developed with any suitable developer. For example a developer such as o-hydroxybenzyl alcohol may be used, in which case the dyestuff obtained on the fibre or material will contain two ω-hydroxy groups of the type according to the present invention. It is to be understood however that in producing dyestuffs upon the material by coupling of amino bases (or amino azo compounds) and a developer, the invention includes the cases when the amino base or the developer or both contain one or more such ω-hydroxy groups.

*C. Miscellaneous dyestuffs*

*Example 5.*—The known compound o-nitro-β-phenyl-β-phenyl-amino-lactic acid.

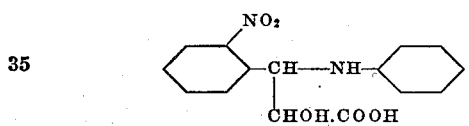

dyes cellulose acetate artificial silk in yellow shades.

*Example 6.*—o-nitro phenyl benzylamine is dissolved in aqueous hydrochloric acid, the molecular quantity of 40% formaldehyde added and the mixture allowed to stand while cooling. After some 24 hours the crystals of the hydrochloride are separated. The dyestuff, which may be isolated by means of caustic soda and may be employed as such or in the form of the hydrochloride, has the formula

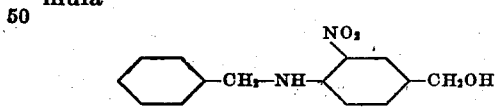

With regard to the dyestuffs or compounds to be applied according to the present invention, it may be stated that the greater the number of hydroxy groups in the side chain or chains, the greater will be the solubility of the dyestuffs or compounds in water and for obvious reasons the use of such water-soluble compounds is to be preferred.

The dyestuffs may be applied to the goods in solution (where they are sufficiently soluble), or in aqueous suspension or they may be brought into colloidal solution by any of the methods known in the art such as by grinding (for example in colloid mills), by dissolving in a solvent and pouring into water containing or not containing protective colloids, by pretreating with solubilising agents, or by other methods. Of the solubilising agents which are suitable for obtaining such dispersions I may mention those described in prior U. S. Patents Nos. 1,618,413, 1,618,414, 1,694,413 and 1,716,721, U. S. application S. No. 134,138; viz, bodies of oily or fatty characteristics, namely higher fatty acids or sulphonated or other derivatives thereof containing salt-forming groups, such as sulphoricinoleic acid or other sulphonated fatty acids or salts of such acids or bodies, for instance their alkali or ammonium salts, used alone or in conjunction with auxiliary solvents as described in U. S. Patent No. 1,690,481 and application S. No. 152,517; carboxylic compounds containing in their structure one or more salt-forming groups or salts of such compounds; sulpho-aromatic fatty acids or salts thereof; and soluble resin soaps or sodium or other soluble salts or soaps of resin acids.

Though in the above description dyestuffs belonging to particular series have been given and further aliphatic side chains containing hydroxy groups only or hydroxy and carboxylic groups only have been described, it is to be understood that the invention extends to the use of dyestuffs or compounds of any series and containing aliphatic side chains which, in addition to one, two or more alcoholic groups attached by carbon to the dye nucleus or component, may contain any other desired substituents.

The invention further comprises the dyeing or otherwise colouring of mixed goods comprising for example, in addition to one or more of the organic substitution derivatives of cellulose, silk, wool or cellulose fibres natural or artificial such as cotton or the cellulose type of artificial silk, in solid or contrasting shades according to affinity of the fibres used in association. The goods may further be dyed with other dyestuffs for the non-ester and non-ether portion thereof either before, after or together with the dyestuffs of the present invention.

The term dyeing in the claims is to be understood to include printing and stencilling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a colouring compound which comprises at least one alcoholic group linked to a dye nucleus through carbon only.

2. Process for dyeing material comprising an organic substitution derivative of cellulose, comprising dyeing the material with an aqueous solution of a colouring compound which comprises at least one alcoholic group linked to a dye nucleus through carbon only.

3. Process for dyeing material comprising an organic substitution derivative of cellulose, comprising dyeing the material with an aqueous colloidal solution of a colouring compound which comprises at least one alcoholic group linked to a dye nucleus through carbon only.

4. Process for dyeing material comprising cellulose acetate, comprising dyeing the material with a colouring compound which comprises at least one alcoholic group linked to a dye nucleus through carbon only.

5. Process for dyeing material comprising cellulose acetate, comprising dyeing the material with an aqueous solution of a colouring compound which comprises at least one alcoholic group linked to a dye nucleus through carbon only.

6. Process for dyeing material comprising cellulose acetate, comprising dyeing the material with an aqueous colloidal solution of a colouring compound which comprises at least one alcoholic group linked to a dye nucleus through carbon only.

7. Process for dyeing material comprising cellulose acetate, comprising dyeing the material with a colouring compound which comprises at least one alcoholic group linked to an anthraquinone dye nucleus through carbon only.

8. Process for dyeing material comprising cellulose acetate, comprising dyeing the material with an aqueous solution of a colouring compound which comprises at least one alcoholic group linked to an anthraquinone dye nucleus through carbon only.

9. Process for dyeing material comprising cellulose acetate, comprising dyeing the material with an aqueous colloidal solution of a colouring compound which comprises at least one alcoholic group linked to an anthraquinone dye nucleus through carbon only.

10. Material comprising an organic substitution derivative of cellulose, dyed with a colouring compound which comprises at least one alcoholic group linked to a dye nucleus through carbon only.

11. Material comprising cellulose acetate, dyed with a colouring compound which comprises at least one alcoholic group linked to a dye nucleus through carbon only.

12. Material comprising cellulose acetate, dyed with a colouring compound which comprises at least one alcoholic group linked to an anthraquinone dye nucleus through carbon only.

13. Process for dyeing material comprising an organic substitution derivative of cellulose, comprising dyeing the material with a coloring compound which comprises at least one alcoholic group linked to an azo dye nucleus thrugh carbon only.

14. Process for dyeing material comprising cellulose acetate, comprising dyeing the material with a coloring compound which comprises at least one alcoholic group linked to an azo dye nucleus through carbon only.

15. Material comprising cellulose acetate, dyed with a coloring compound which comprises at least one alcoholic group linked to an azo dye nucleus through carbon only.

In testimony whereof I have hereunto subscribed my name.

HENRY DREYFUS.